No. 749,047. PATENTED JAN. 5, 1904.
P. H. FONTAINE.
SHOCK BINDER.
APPLICATION FILED SEPT. 20, 1902.
NO MODEL.
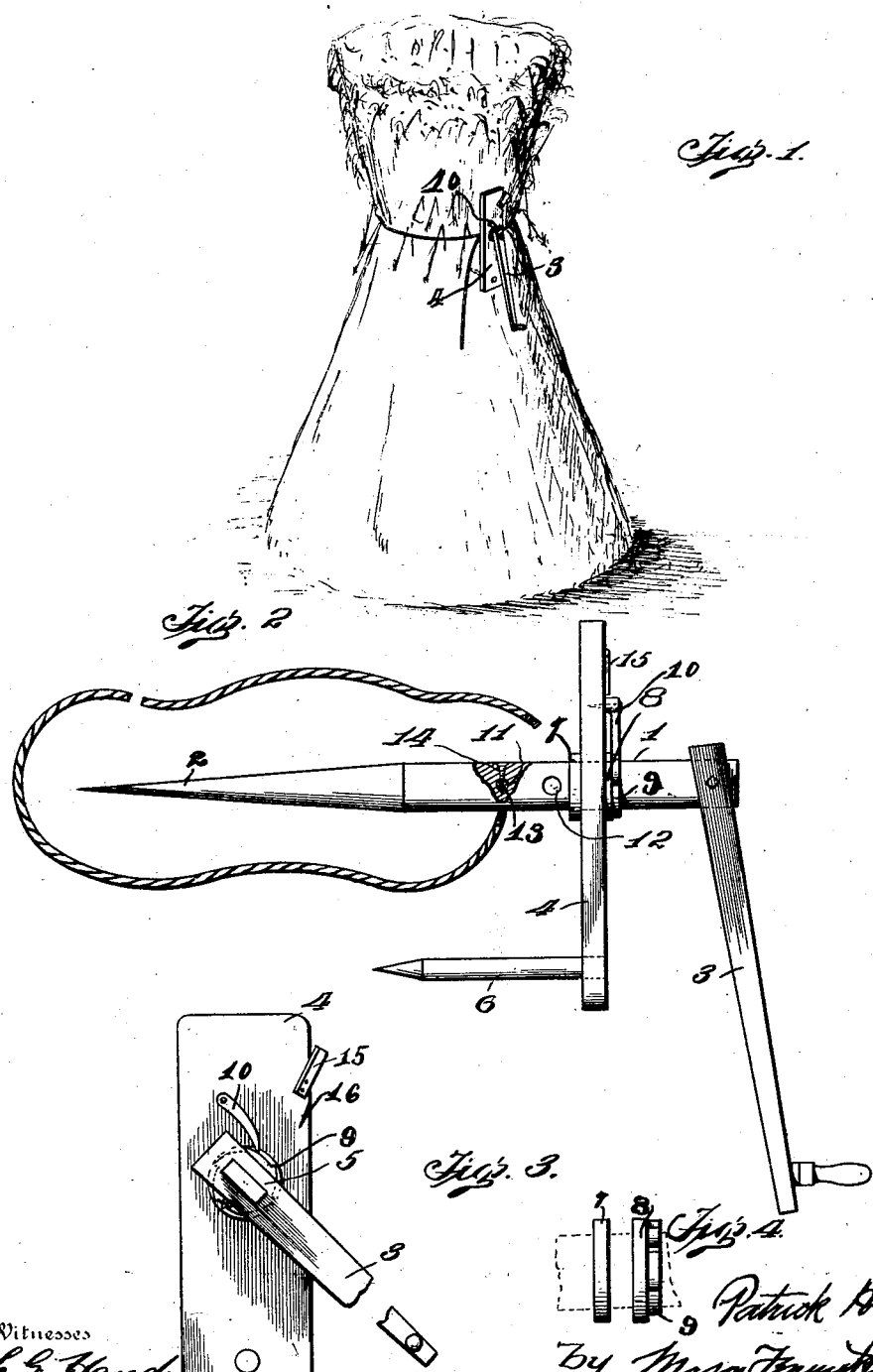

No. 749,047. Patented January 5, 1904.

UNITED STATES PATENT OFFICE.

PATRICK H. FONTAINE, OF BETHEL HILL, NORTH CAROLINA.

SHOCK-BINDER.

SPECIFICATION forming part of Letters Patent No. 749,047, dated January 5, 1904.

Application filed September 20, 1902. Serial No. 124,257. (No model.)

*To all whom it may concern:*

Be it known that I, PATRICK H. FONTAINE, a citizen of the United States, residing at Bethel Hill, in the county of Person and State of North Carolina, have invented certain new and useful Improvements in Shock-Binders; and I do hereby declare the following to be a full, clear, and exact description of the invention, such as will enable others skilled in the art to which it appertains to make and use the same.

My invention relates to improvements in shock-binders; and it consists of certain novel constructions, combinations, and arrangements of parts, as will be hereinafter fully described and claimed.

In the accompanying drawings, Figure 1 is a perspective view of a shock having my invention applied thereto. Fig. 2 is a side elevation of my improved binder. Fig. 3 is a detailed front or face view of the base-plate, showing more clearly the pawl-and-ratchet mechanism and means for holding the binding-twine and severing the same. Fig. 4 is a fragmentary view of the shaft, showing collars or rings carried thereby and positively fastened thereto.

1 in the drawings represents a spindle or shaft, which is preferably sharpened at one end, as at 2. The other end of the spindle carries a handle 3, by means of which the spindle is rotated. The spindle is passed through a base-plate 4, which is substantially rectangular in shape and is made of sufficient width and length to prevent the loose ends of the fodder catching into the pawl-and-ratchet mechanism 5, carried thereby, and also to assist in supporting the binder in position upon the shock while the binding rope is being passed around the shock for the purpose of compressing the same. The base-plate 4 also carries an impaling-pin 6, which extends at substantially a right angle thereto and is designed to be forced into the shock at the same time that the spindle 1 is forced therein. The object of this impaling-pin 6 is to prevent the plate 4 from rotating when the operator releases his grasp on the handle or crank 3.

7 and 8 represent collars or rings carried by the spindle or shaft 1 and positively fastened thereto, the ring 8 being provided with ratchet-teeth 9, which are designed to be engaged by a pawl 10, the latter being pivoted to the face of the base-plate 4. By this construction and arrangement the spindle can be readily revolved by means of the crank, and the base-plate 4 and the impaling-pin 6, carried thereby, remain stationary, and when the operator releases his grasp on the crank the pawl will prevent the spindle from unwinding, and the impaling-pin 6 will prevent the base-plate and pawl carried thereby also from rotating. The spindle 1 is provided with an aperture 11 and a larger aperture 12. One end of the binding-rope 13 is secured in the smaller aperture in any suitable manner, but preferably by means of a screw 14, which extends transversely into the spindle and is preferably countersunk or has its head flush with the surface of the spindle, so as to secure for the spindle a smooth unbroken surface free of all projections of any kind. The other end of the binding-rope 13 is passed loosely through the larger aperture 12. To facilitate the insertion and passage of the ends of the rope through these apertures, they are preferably bound with twine or otherwise, so as to prevent said ends from unraveling and to present a smooth compact surface at the ends, which of course facilitates the manipulation of the rope in passing the same through the apertures 11 and 12. It will be observed that the rings 7 and 8 are located on opposite sides of the base-plate 4, which construction is very important, as it prevents the spindle from having an endwise movement and serves as a bearing or box for the spindle without the spindle being grooved or notched in any way. The construction and arrangement is very simple and is very effective for the purpose indicated. It will also be observed that one of these rings which constitutes one side of a box also serves as a ratchet, which also makes it a very compact and especially effective construction, and also by having the base-plate 4 made of a greater width than the rings there is no liability of the material being bound catching in the pawl-and-ratchet mechanism.

In binding a shock the following operation is carried out: The operator holds the free end of the binding-rope 13 in his left hand and away from the shock, forces the spindle and impaling-pin into the shock, and then walks around the shock, with the binding-rope in his hand, and passes the free end of said rope through the large aperture 12. He then grasps this end of the rope with his left hand and the crank with his right hand and pulls on the rope until he has taken up about all the slack that he can with his hand. While still holding onto the rope he revolves the crank, and consequently the spindle, and the loose end of the rope being thus wound several times around the spindle it will be held in such position without being held by the hand of the operator, and the operator then continues to turn the crank until the desired compression of the shock has been secured. The great advantage and importance of the large aperture 12 is apparent, as it enables the operator to rapidly take up the slack by pulling on the rope, which is much more expeditious than when all the drawing in of the rope is done by winding the rope on the spindle through the means of the crank. As soon as the desired compression is secured the operator ceases to turn the crank, and the spindle is prevented from turning backward by means of the pawl-and-ratchet mechanism. In order to tie the shock, the operator passes the binding-twine in between the base-plate and the shock and secures the end thereof in the kerf or slit 16, as clearly shown in Fig. 3, and then passes said twine around the shock and to the point of starting and severs the twine at the proper point by means of a knife 15, carried by the base-plate, and then ties the two ends of the twine together.

I have experimented extensively in producing this device, and I have found that any projection on the spindle, such as a hook or eye to which to fasten the rope or through which to pass the same or even a knot in the end of the rope, is very objectionable, as it catches the material being shocked while the spindle is being revolved and becomes entangled in the mechanism and greatly retards the operation of the device.

Having thus fully described my invention, what I claim as new, and desire to secure by Letters Patent, is—

1. In a device of the character described, the combination with a spindle provided with two apertures, a binding-rope, means for securing one end of the binding-rope in the smaller of the apertures, the other aperture arranged to have the other end of said rope loosely passed through the same, a base-plate through which the spindle passes, a pawl-and-ratchet mechanism carried by said plate, a knife carried by the base-plate and means for holding the device in a fixed position upon a shock.

2. A shock-binder, comprising in its construction a spindle, means for rotating the same, means carried by said spindle for securing one end of a binding-rope, and an aperture permitting the other end of the binding-rope to be passed therethrough, a base-plate through which the spindle passes, means for preventing the spindle having an accidental backward movement, the base-plate being provided with a kerf for holding the binding-twine, substantially as described.

3. A shock-binder, comprising in its construction a spindle, means for rotating the same, means carried by the spindle for securing one end of a binding-rope and an aperture permitting the other end of the binding-rope to be passed through the spindle, a base-plate through which the spindle passes, said base-plate carrying an impaling-pin at right angles thereto, and said base-plate also provided with means for holding the end of the binding-twine, and carrying a knife for severing the same, substantially as described.

4. A shock-binder comprising in its construction a base-plate, a spindle passed rotatably through said plate, means for rotating the spindle, two apertures extending transversely through the spindle, a binding-rope, means for securing one end of the binding-rope in one of said apertures, the other end of the rope adapted to be passed loosely through the other aperture, an impaling-pin extending at right angles from the base-plate, and means for holding the spindle against backward rotation, substantially as described.

5. In a device of the character described, a spindle provided with two apertures extending transversely through the same, a binding-rope secured in one of said apertures and adapted to be passed loosely through the other aperture for quickly taking up the slack rope by pulling on the same with the hand, substantially as described.

6. In a device of the character described, the combination of a suitable spindle provided with means for holding one end of a binding-rope, and with means for permitting the other end of the rope to be passed freely therethrough, means for rotating the spindle, a base-plate through which the spindle passes, said base-plate being provided with means for holding the end of the binding-twine, and means for severing said twine, substantially as described.

In testimony whereof I hereunto affix my signature in presence of two witnesses.

PATRICK H. FONTAINE.

Witnesses:
E. T. FENWICK,
JOHN L. FLETCHER.